(12) United States Patent
Neiderman et al.

(10) Patent No.: US 8,128,720 B2
(45) Date of Patent: Mar. 6, 2012

(54) METHOD AND APPARATUS FOR REMOVING CONTAMINANTS FROM A REFLOW APPARATUS

(75) Inventors: John Neiderman, Camdenton, MO (US); Rita Mohanty, East Greenwich, RI (US); Marc C. Apell, Westminster, CO (US); Azhar Qureshi, Whitinsville, MA (US); Giovanni Filippelli, Uxbridge, MA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/185,314

(22) Filed: Jul. 18, 2011

(65) Prior Publication Data

US 2011/0272451 A1 Nov. 10, 2011

Related U.S. Application Data

(62) Division of application No. 11/807,659, filed on May 30, 2007.

(51) Int. Cl.
*B01D 53/00* (2006.01)

(52) U.S. Cl. ........ 55/385.1; 55/385.6; 55/392; 55/282.3; 55/467.1; 55/DIG. 10; 95/39; 95/273; 95/288

(58) Field of Classification Search ............... 55/385.1, 55/385.6, 282.3, 392, 467.1, 283–284, DIG. 10, 55/DIG. 29, DIG. 30; 95/39, 273, 288; 228/18, 228/19; 62/617
See application file for complete search history.

(56) References Cited

U.S. PATENT DOCUMENTS

| 4,321,031 | A | 3/1982 | Woodgate |
| 4,912,857 | A | 4/1990 | Parent et al. |
| 4,996,781 | A | 3/1991 | Mishina et al. |
| 5,611,476 | A | 3/1997 | Soderlund et al. |

(Continued)

FOREIGN PATENT DOCUMENTS

DE 102005057457 A1 8/2006

(Continued)

OTHER PUBLICATIONS

International Search Report for PCT/US2008/062735 mailed Sep. 2, 2008.

(Continued)

*Primary Examiner* — Jason M Greene
*Assistant Examiner* — Karla Hawkins
(74) *Attorney, Agent, or Firm* — Lando & Anastasi, LLP

(57) ABSTRACT

A reflow apparatus for solder joining electronic components to a substrate includes a reflow chamber, a conveyor to convey a substrate within the chamber, at least one heating element to provide heat to reflow solder on the substrate, and at least one system to remove contaminants generated from the reflow solder. The system is coupled with the chamber for passage of a vapor stream from the chamber through the system. The system comprises a contaminant collection unit in fluid communication with the vapor stream. The contaminant collection unit includes a coil and a collection container. The coil is configured to receive cooled gas therein. The arrangement is such that when introducing cooled gas in the coil, contaminants in the vapor stream condense on the coil, and when ceasing the introduction of cooled gas in the coil, contaminants in the vapor stream are released from the coil and collected in the collection container. Other embodiments and methods for removing contaminants are further disclosed.

17 Claims, 4 Drawing Sheets

U.S. PATENT DOCUMENTS

| | | | |
|---|---|---|---|
| 5,993,500 A | 11/1999 | Bailey et al. |
| 6,146,448 A | 11/2000 | Shaw et al. |
| 6,576,030 B2 | 6/2003 | Mullins |
| 6,694,637 B2 | 2/2004 | Miller, Jr. et al. |
| 6,749,644 B2 | 6/2004 | Chassot et al. |
| 6,749,655 B2 | 6/2004 | Dautenhahn |
| 6,780,225 B2 | 8/2004 | Shaw et al. |
| 6,808,554 B2 | 10/2004 | Mullins |
| 7,014,673 B2 | 3/2006 | Mullins |
| 2003/0143448 A1 | 7/2003 | Keefer |
| 2006/0168952 A1 | 8/2006 | Opris |

FOREIGN PATENT DOCUMENTS

| | | |
|---|---|---|
| EP | 1702705 A1 | 9/2006 |
| JP | 2000174429 A | 6/2000 |
| JP | 2006339375 A | 12/2006 |

OTHER PUBLICATIONS

Finnish Search Report for Patent No. 20096409 dated Jun. 8, 2010.

METHOD AND APPARATUS FOR REMOVING CONTAMINANTS FROM A REFLOW APPARATUS

CROSS-REFERENCE TO RELATED APPLICATIONS

This application is a divisional of pending U.S. patent application Ser. No. 11/807,659, filed May 30, 2007, and entitled METHOD AND APPARATUS FOR REMOVING CONTAMINANTS FROM A REFLOW APPARATUS, which is herein incorporated by reference in its entirety.

BACKGROUND OF THE INVENTION

1. Field of Invention

This application relates generally to the surface mount of electronic components onto a printed circuit board by employing a reflow process, and more particularly to a system and method for extracting and collecting vaporized contaminants (e.g., flux) out of a reflow oven, and removing the collected contaminants without interrupting the surface mount production.

2. Discussion of Related Art

In the fabrication of printed circuit boards, electronic components are often surface mounted to a bare board by a process known as "reflow soldering." In a typical reflow soldering process, a pattern of solder paste is deposited onto the circuit board, and the leads of one or more electronic component are inserted into the deposited solder paste. The circuit board is then passed through an oven where the solder paste is reflowed (i.e., heated to a melt or reflow temperature) in the heated zones and then cooled in a cooling zone to electrically and mechanically connect the leads of the electronic component to the circuit board. The term "circuit board," as used herein, includes any type of substrate assembly of electronic components, including, for example, wafer substrates.

Solder paste typically includes not only solder, but also flux to promote solder wetting and to provide good solder joints. Other additives, such as solvents and activators, can also be included. After the solder paste is deposited on the circuit board, the circuit board is passed on a conveyor through a plurality of heating zones of a reflow soldering machine. As the solder paste melts, volatile organic compounds (referred to as "VOCs") in the flux and other additives are vaporized and tend to condense in the reflow machine. In many of the reflow furnaces, soldering is performed in an inert atmosphere using primarily nitrogen to reduce oxidation on solder surfaces.

In certain reflow machines, the heating zones are separated into a number of different zones, including pre-heat zones, soak zones, and spike zones. In the pre-heat zones and the soak zones, the products are heated and the VOCs in the flux vaporize in the surrounding gas atmosphere. The spike zones are hotter than the pre-heat and soak zones, and it is in the spike zones that the solder melts. The spike zones are also the zones where higher temperature VOCs, such as rosin or resin, will vaporize. A reflow soldering machine may have many heating zones, and these heating zones may be varied depending on the products to be soldered. Different products require different heat profiles, and the reflow soldering machine should be flexible so that, in one example, a machine with ten heating zones may have one pre-heat zone followed by seven soak zones and two spike zones for one type of circuit board, and for a different type of board may have three pre-heat zones, six soak zones and one spike zone. One or more cooling zones follow the heating zones in which the solder solidifies on the solder areas (e.g., electronic pads typically fabricated from copper or a copper alloy) of the circuit board.

If VOCs pass from the heating zones into the cooling zones, those compounds have a tendency to condense in the cooling zones. This condensate may impair cooling functions and may present processing problems. The most common problem occurs with no-clean, enhanced, print performance solder pastes. These pastes utilize viscosity modifiers to achieve superior printing performance. Problems may arise when the viscosity modifying components condense in the cooling zones. By nature, these residues are a viscous liquid and can build up and drip onto the soldered product from the cooling zone surfaces, such as heat exchangers positioned within the cooling zones.

Known methods for removing these VOCs typically employ heat exchangers that cool a hot gas stream removed from a process chamber and thereby condense organic compounds in the gas stream on a surface of the heat exchanger. The condensate can then be removed with a condensate filter before the gas stream is returned to the process chamber. With such known methods, the condensate filter must be cleaned periodically, which requires the interruption of the reflow oven.

BRIEF SUMMARY OF THE INVENTION

Embodiments of the invention provide improvements to reflow oven flux extraction systems, such as those described above. One aspect of the invention is directed to a reflow apparatus for solder joining electronic components to a substrate. The apparatus comprises a reflow chamber, a conveyor to convey a substrate within the chamber, at least one heating element to provide heat to reflow solder on the substrate, and at least one filtration system to remove contaminants generated by the reflow solder. The at least one filtration system is coupled with the chamber for passage of a vapor stream from the chamber through the filtration system. The at least one filtration system comprises a first stage unit including a cooling device and a filter device disposed adjacent the cooling device. The cooling device has a plurality of cooling fins to cool the vapor stream entering into the first stage unit. The arrangement is such that contaminants in the vapor stream condense on the cooling fins when passing the vapor stream over the cooling fins and are trapped by the filter device.

Embodiments of the apparatus may comprise the first stage unit further including a heating element to heat contaminants condensed on the cooling fins and trapped by the filter device. The first stage unit further includes at least one collection container to collect heated contaminants from the cooling fins and the filter device. In one embodiment, the first stage unit further includes a base having the cooling fins mounted thereon and a water-cooled chill plate secured to the base. In another embodiment, the first stage unit further includes a base having the cooling fins mounted thereon, and a thermal removal element secured to the base. The thermal removal element includes a plurality of heat removal fins. The apparatus may further comprise a second stage unit in fluid communication with the first stage unit to further remove contaminants within the vapor stream. The second stage unit includes a coil and a collection container. The coil is configured to receive one of cooled gas and heated gas therein. The arrangement is such that when introducing cooled gas in the coil, contaminants in the vapor stream condense on the coil, and when introducing heated gas in the coil, contaminants in the vapor stream are released from the coil and collected in the collection container. In a particular embodiment, the coil is in fluid communication with a gas delivery tube and the gas delivery tube is a vortex tube.

Another aspect of the invention is directed to a reflow apparatus for solder joining electronic components to a substrate. A certain embodiment is directed to the apparatus comprising a reflow chamber, a conveyor to convey a substrate within the chamber, at least one heating element to provide heat to reflow solder on the substrate, and at least one system to remove contaminants generated from the reflow solder. The at least one system is coupled with the chamber for passage of a vapor stream from the chamber through the system. The at least one system comprises a contaminant collection unit in fluid communication with the vapor stream. The contaminant collection unit includes a coil and a collection container. The coil is configured to receive cooled gas therein. The arrangement is such that when introducing cooled gas in the coil, contaminants in the vapor stream condense on the coil, and when ceasing the introduction of cooled gas in the coil, contaminants in the vapor stream are released from the coil and collected in the collection container.

Embodiments of the apparatus may comprise the coil being in fluid communication with a gas delivery tube, with the gas delivery tube being a vortex tube. A heating element may be provided to heat gas that is introduced in the coil.

Yet another aspect of the invention is directed to a method for removing vaporized contaminants from inside a reflow apparatus. In a certain embodiment, the method comprises: extracting a vapor stream including vaporized contaminants from a reflow apparatus; directing the vapor stream to a system configured to remove contaminants from the vapor stream; passing the vapor stream over cooling fins of the system; condensing vaporized contaminants on the cooling fins; periodically heating the cooling fins to remove contaminants from the cooling fins; and collecting the removed contaminants from the cooling fins.

Embodiments of the method may further comprise passing the vapor stream through a filter device. The method may further include one or more of (a) passing the vapor stream over at least one cooling coil and condensing vaporized contaminants on the cooling coil, (b) periodically raising the temperature of the cooling coil to remove contaminants from the coil, and (c) collecting the removed contaminants from the cooling coil.

And finally, another aspect of the invention is directed to a method for removing vaporized contaminants from inside a reflow apparatus. In a particular embodiment, the method comprises: extracting a vapor stream including vaporized contaminants from a reflow apparatus; directing the vapor stream to a system configured to remove contaminants from the vapor stream; passing the vapor stream over at least one cooling coil of the system; condensing vaporized contaminants on the cooling coil; periodically heating the cooling coil to remove contaminants from the cooling coil; and collecting the removed contaminants from the cooling coil.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
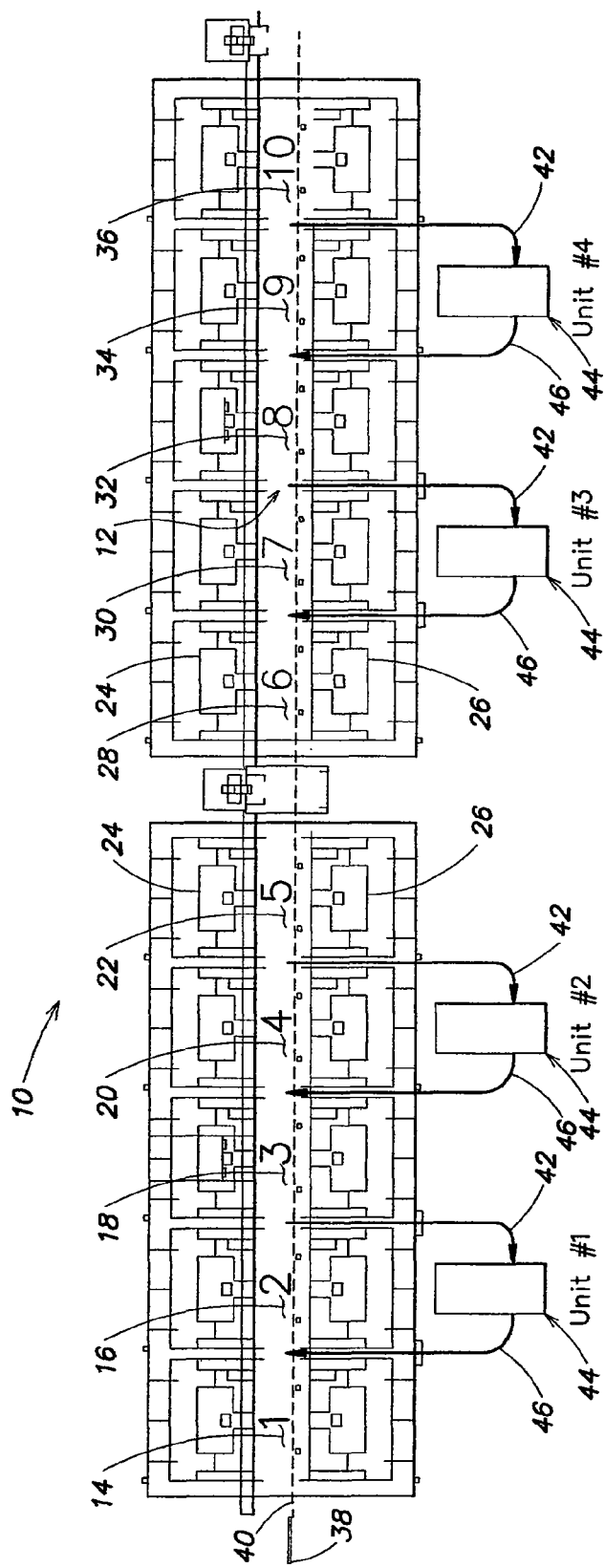
FIG. 1 is a schematic view showing a reflow soldering oven of an embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Embodiments of the invention may be directed to the use of a two-stage flux extraction and filtration system that is used with a reflow soldering machine. Although the two-stage system is particularly useful in reflow soldering applications, embodiments of the two-stage system can also be employed in other applications. For example, within the context of printed circuit board assembly, the two-stage system can alternatively be used to extract and filter similar flux residues emitted from other types of soldering apparatus, such as a wave soldering machine. In addition, the system may employ only one of the two stage units to achieve the flux extraction function.

Solder paste is routinely used in the assembly of printed circuit boards, where the solder paste is used to join electronic components to the circuit board. Solder paste includes solder for joint formation and flux for preparing metal surfaces for solder attachment. The solder paste may be deposited onto the metal surfaces (e.g., electronic pads) provided on the circuit board by using any number of application methods. In one example, a stencil printer may employ a squeegee to force the solder paste through a metallic stencil laid over an exposed circuit board surface. Leads of an electronic component are aligned with and impressed into the solder deposits to form the assembly. In reflow soldering processes, the solder is then heated to a temperature sufficient to melt the solder and cooled to permanently couple the electronic component, both electrically and mechanically, to the circuit board. The solder typically includes an alloy having a melting temperature lower than that of the metal surfaces to be joined. The temperature also must be sufficiently low so as to not cause damage to the electronic component. In certain embodiments, the solder may be a tin-lead alloy. However, solders employing lead-free materials may also be used.

In the solder, the flux typically includes a vehicle, solvent, activators and other additives. The vehicle is a solid or non-volatile liquid that coats the surface to be soldered and can include rosin, resins, glycols, polyglycols, polyglycol surfactants, and glycerine. The solvent, which evaporates during the pre-heat and soldering process, serves to dissolve the vehicle activators, and other additives. Examples of typical solvents include alcohols, glycols, glycol esters and/or glycol ethers and water. The activator enhances the removal of metal oxide from the surfaces to be soldered. Common activators include amine hydrochlorides, dicarboxylic acids, such as adipic or succinic acid, and organic acids, such as citric, malic or abietic acid. Other flux additives can include surfactants, viscosity modifiers and additives for providing low slump or good tack characteristics for holding the components in place before reflow.

One embodiment of a reflow soldering apparatus for soldering the circuit board assembly is shown in FIG. 1. Such apparatus are sometimes referred to as reflow ovens in the art of printed circuit board fabrication and assembly. The apparatus, generally indicated at 10 in FIG. 1, includes a chamber in the form of a thermally insulated tunnel 12 defining a passage for pre-heating, reflowing and then cooling solder on a circuit board passing therethrough. The tunnel 12 extends across a plurality of heating zones, including, in one example, two pre-heat zones 14, 16 followed by three soak zones 18, 20, 22, each zone comprising top and bottom heating elements 24, 26, respectively. The soak zones 18, 20, 22 are followed by three spike zones 28, 30, 32, for example, which likewise include heating elements 24, 26. And finally, two cooling zones 34, 36 follow the spike zones 28, 30, 32.

A circuit board assembly 38, including deposited solder paste and electronic components, is passed (e.g., left-to-right in FIG. 1) through each zone of the thermally insulated tunnel 12 on a fixed-speed conveyor, indicated by dashed lines at 40 in FIG. 1, thereby enabling controlled and gradual pre-heat, reflow and post-reflow cooling of the circuit board assembly. In one embodiment, the heating elements 24, 26 may embody resistance heaters that heat the circuit board assembly via convection heating. In the preliminary pre-heat zones 14, 16, the board is heated from ambient temperature up to the flux activation temperature, which may range between about 130° C. and about 150° C. for lead-based solders and higher for lead-free solders.

In the soak zones 18, 20, 22, variations in temperature across the circuit board assembly are stabilized and time is provided for the activated flux to clean the component leads, electronic pads and solder powder before reflow. Additionally, VOCs in the flux are vaporized. The temperature in the soak zones 18, 20, 22 is typically about 140° C. to about 160° C. for lead-based solders and higher for lead-free solders. In certain embodiments, the circuit board assembly may spend about thirty to about forty-five seconds passing through the soak zones 18, 20, 22.

In the spike zones 28, 30, 32, the temperature quickly increases to a temperature above the melting point of the solder to reflow the solder. The melting point for eutectic or near-eutectic tin-lead solder is about 183° C., with the reflow spike being typically set about 25° C. to about 50° C. above the melting point to overcome a pasty range of molten solder. For lead-based solders, a typical maximum temperature in the spike zones is in the range of about 200° C. to about 220° C. Temperatures above about 225° C. may cause baking of the flux, damage to the components and/or sacrifice joint integrity. Temperatures below about 200° C. may prevent the joints from fully reflowing. In one embodiment, the circuit board assembly is typically maintained at a temperature within the spike zones 28, 30, 32 above the reflow temperature for about one minute.

Finally, in the cooling zones 34, 36, the temperature drops below the reflow temperature, and the circuit board assembly is cooled sufficiently to solidify the joints and thereby preserve joint integrity before the assembly leaves the tunnel 12.

Still referring to FIG. 1, an input gas duct 42 is shown exiting between the second pre-heat zone 16 and the first soak zone 18, then passing through a flux extraction/filtration system generally indicated at 44 and into an output gas duct 46. The output gas duct 46 reconnects with the tunnel between the first and second pre-heat zones 14, 16. In operation, a vapor stream is withdrawn from the tunnel 12 through the input gas duct 42, through the system 44, then through the output gas duct 46 and back to the tunnel. Similar constructions of input gas ducts 42, systems 44 and output gas ducts 46 are likewise positioned to withdraw vapor streams from between the second and third soak zones 20, 22 and from between the second and third spike zones 30, 32 and the third spike zone and the first cooling zone 34.

Figure 2:
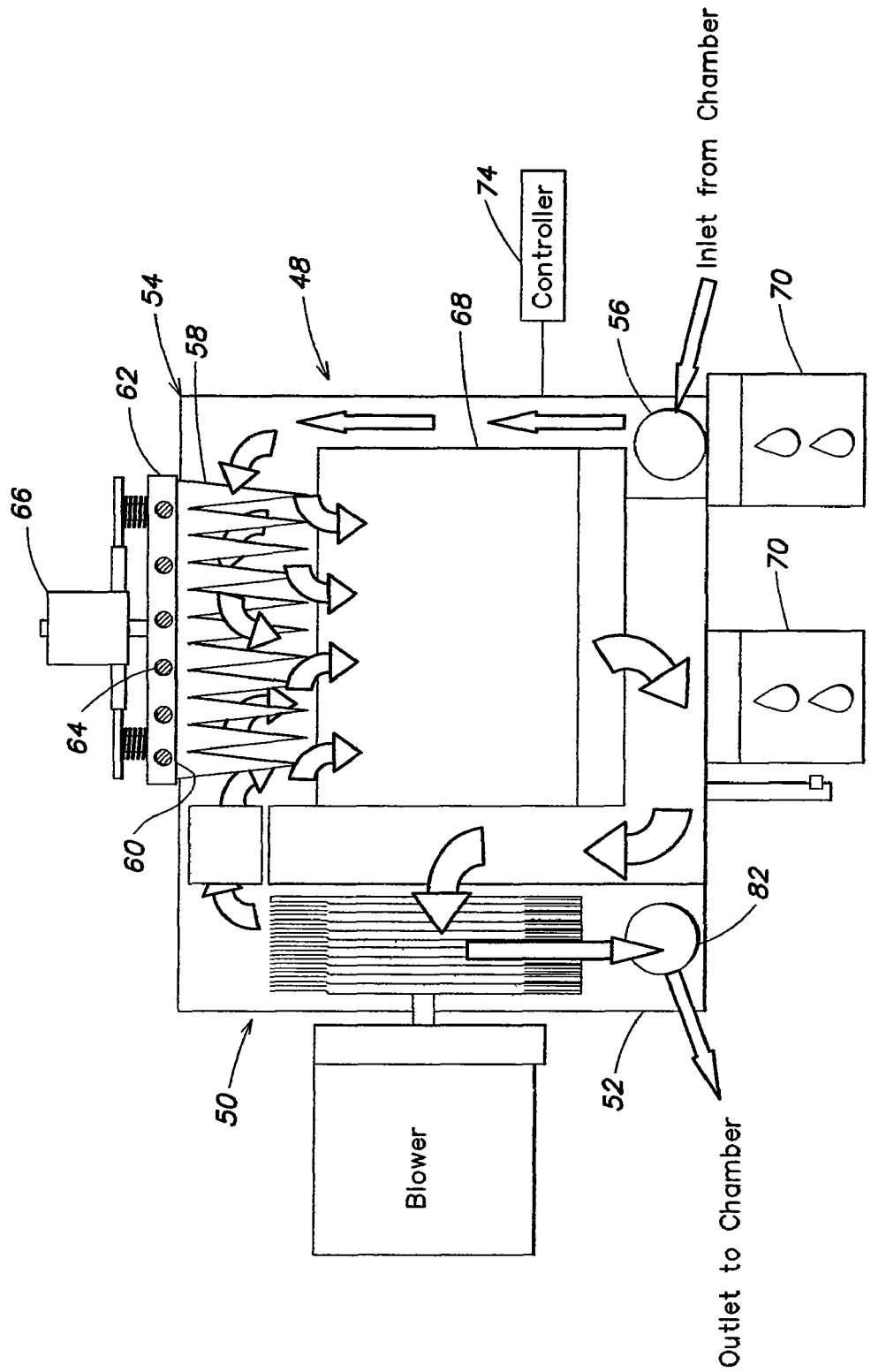
FIG. 2 is a schematic view of a filtration system of an embodiment of the invention.

In a certain embodiment, one of the flux extraction/filtration systems 44 is schematically illustrated in FIG. 2. As shown, the system 44 includes a first stage unit, generally indicated at 48 and a second stage unit, generally indicated at 50. A common housing 52 may be provided to support the components of the first and second units 48, 50. Alternatively, two separate housings (not shown), one housing for the first stage unit 48 and a separate housing for the second stage unit 50, may be provided. The housing 52 includes a chamber 54 that is in fluid communication with the tunnel 12 by way of an inlet 56, which connects the system 44 to the input gas duct 42. The arrangement is such that a vapor stream from the tunnel 12 enters the chamber 54 of the first stage unit 48 via the inlet 56 to remove contaminants from the vapor stream. As discussed above, the system 44 in general and the first stage unit 48 in particular are designed to remove flux contained within the solder, but other contaminants may be removed as well.

The first stage unit 48 includes a plurality of cooling fins indicated at 58 through which the vapor stream passes when first entering into the first stage unit of the system 44. In one embodiment, the cooling fins 58 are attached to a base 60 provided within the chamber 54. As shown in FIG. 2, the base 60 may be secured to a chill plate 62, which is designed to have a cool fluid, such as chilled water, flow through the chill plate by a coil 64. In a certain embodiment, spring-loaded latches releasably attach the chill plate 62 to the base 60. In another embodiment, which is shown in FIG. 2, a pneumatically operated chill plate lift mechanism 66 may be employed. The cooling fins 58, the base 60 and the chill plate 62 may be fabricated from a thermally conductive material, such as aluminum. The cool fluid traveling through the coil 64 cools the chill plate 62, the base 60 and the cooling fins 58, thereby cooling the vapor stream as the vapor stream passes through the cooling fins. The cooling fins 58 are designed so that contaminants, e.g., flux, condenses on the cooling fins as the vapor stream passes therethrough. The removal of the coalesced contaminants from the cooling fins 58 will be discussed in greater detail below.

Provided below the cooling fins 58 within the chamber 54 of the housing is a filter device 68. The filter device 68 may include filtration materials of the type disclosed in U.S. Pat. No. 6,749,655, entitled FILTRATION OF FLUX CONTAMINANTS, issued on Jun. 15, 2004, which is incorporated herein by reference and assigned to the assignee of the present invention. For example, the filter device 68 may include steel balls and a cooling coil that are designed to trap VOCs and other contaminants. The filtration device may also include other materials, such as wire mesh or cloth materials. Contaminant collection containers or jars 70 may be provided below the filter device 68. This configuration enables the coalesced contaminants that condense onto the filter device to drip into the jars 70. The jars 70 may be removed periodically, without interrupting the operation of the reflow apparatus 10 to be emptied and replaced. The arrangement is such that the vapor stream expands and increases in pressure as the stream enters the chamber 54, thereby causing the contaminants to condense as droplets on the cooling fins 58 and the filter device 68.

A booster heater may be provided to direct heat within the chamber 54 of the housing 52 to clean the contaminants condensed on the cooling fins 58 and trapped within the filter device 68. In other embodiments, an in-line heater with air injection may be employed. The booster heater may be configured to heat the coalesced and trapped contaminants so that they return to liquid form. Once heated, the liquefied contaminants drip off of the cooling fins 58 and flow through the filtration device 68 where they are collected by the jars 70 provided at the bottom of the first stage unit 48. The reflow apparatus 10 further includes a controller 74 to control the operation of the reflow apparatus 10, including the operation of the extraction/filtration system 44. The controller 74 enables the operator of the reflow apparatus 10 to set a cycle time and a duration time of the operation of the booster heater to periodically clean the cooling fins 58 and the filter device 68.

In operation, the cooling fins 58 provide cooling to the vapor stream to collect contaminants, e.g., flux, from the vapor stream. The booster heater may be activated, either manually by the operator or periodically under the control of the controller 74, to increase the temperature inside the chamber 54 to a temperature sufficient to melt the flux contaminants and drain the liquefied contaminants into the collection jars 70 while the reflow apparatus 10 is still operating. After the cleaning cycle is completed, the first stage unit 48 returns to its normal contaminant collection cycle. In certain circumstances, the lift mechanism 66 may be employed to separate the chill plate 62 and the base 60 to provide an extra temperature boost (increase) for self-cleaning. By lifting the chill plate 62 from the base 60, heat inside the chamber 54 will increase to clean the chamber.

Figure 3:
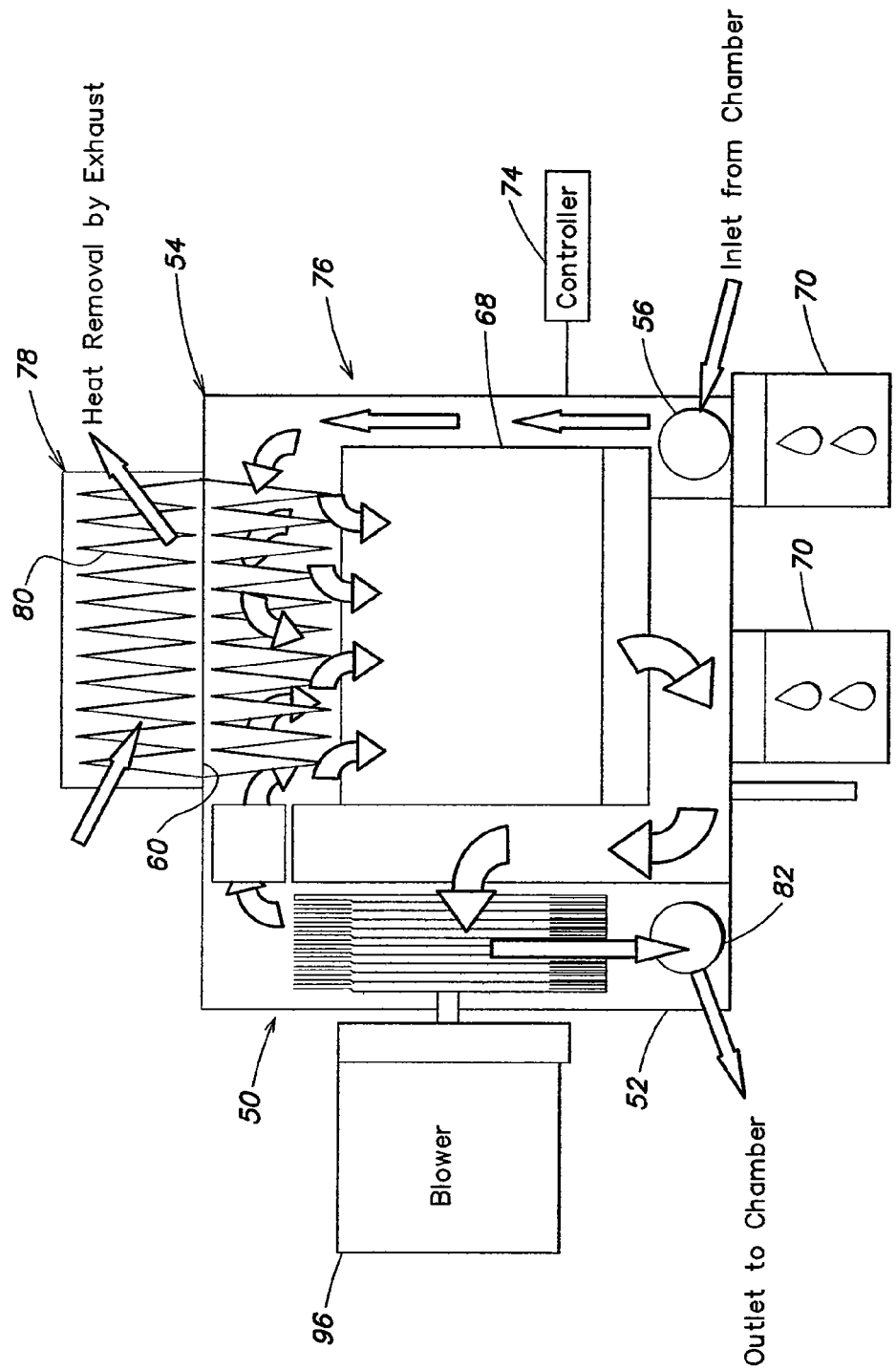
FIG. 3 is a schematic view of a filtration system of another embodiment of the invention.

Turning now to FIG. 3, another embodiment of the first stage unit is generally designated at 76. As shown, most of the components of the first stage unit 76 are generally the same as the components of the first stage unit 48 shown in FIG. 2, with the similar components being designated by like reference numbers. The primary difference between the first and second stage units 48, 76 is the provision of a thermal removal element or heat sink 78 secured to the top of the base 60 in place of the chill plate 62. Specifically, the heat sink 78 includes a plurality of heat removal fins 80, which are designed to draw heat away from the base 60 and the cooling fins 58 thereby cooling the cooling fins. The heat removal fins 80 are configured to dissipate heat from the base 60 and cooling fins 58 by either adding convection fan or exhaust duct heat over fins outside of the chamber 54. This arrangement is particularly useful in situations in which there is no supply of coolant, e.g., chilled water, to the reflow apparatus 10. With the embodiment shown in FIG. 3, the system 44 does not rely on active cooling to condense VOCs but instead on the dissipation of the heat through the heat removal fins 80.

As shown in FIGS. 2 and 3, approximately fifty percent of the vapor stream travels from the first stage unit (48 or 76) to the second stage unit 50 for further removal of contaminants from the vapor stream. The removal of contaminants by the second stage unit 50 will be discussed in greater detail below. After passing through the second stage unit 50, the vapor stream exits through an outlet 82, which is in fluid communication with the output gas duct 46 where the cleaned vapor stream is reintroduced in the tunnel 12.

Figure 4:
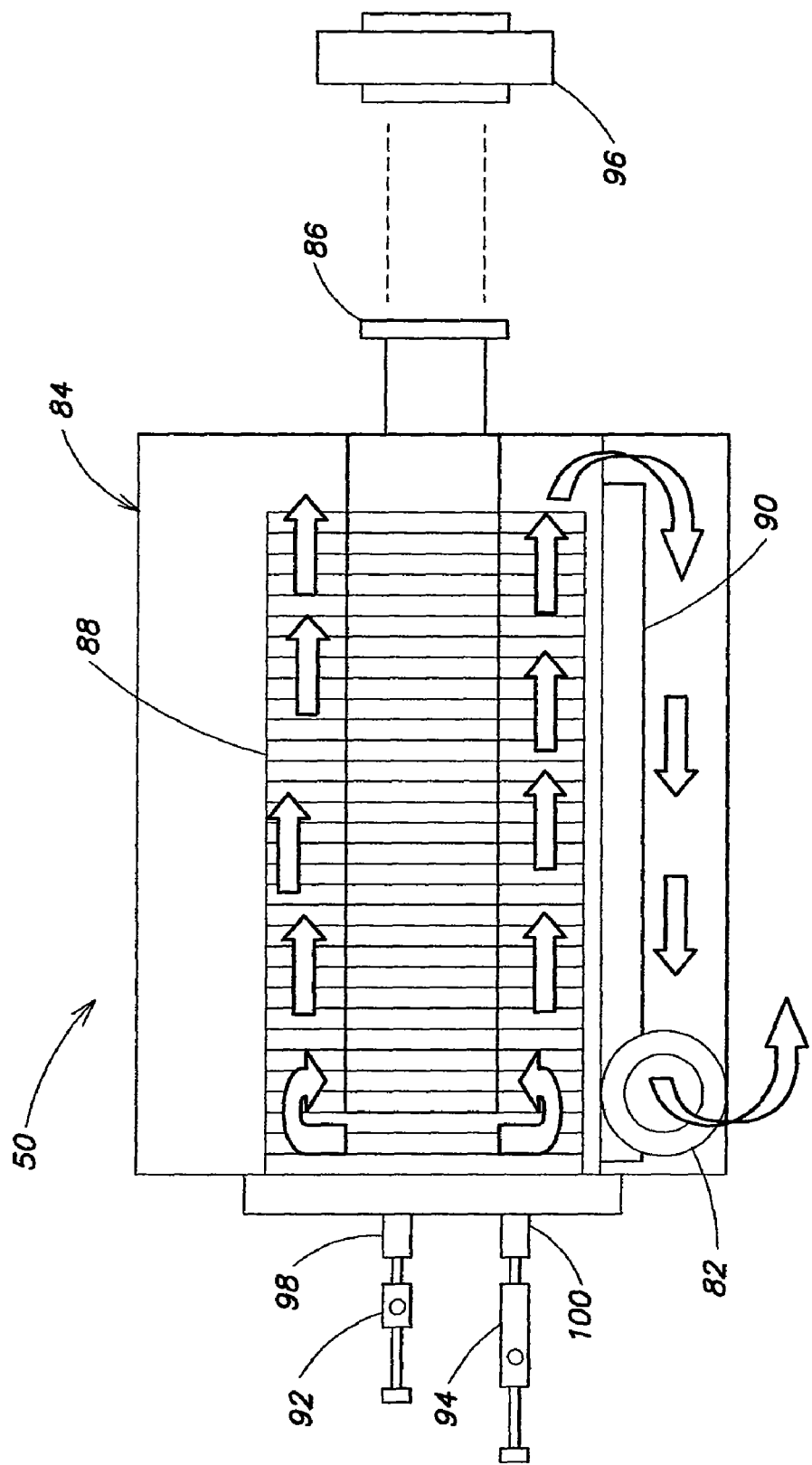
FIG. 4 is a schematic view of a flux collection system of an embodiment of the invention.

Turning now to FIG. 4, the second stage unit 50 illustrated in FIGS. 2 and 3 is shown in greater detail. As shown, the vapor stream from the first stage unit (48 or 76) enters into a chamber 84 of the second stage unit 50 through an inlet 86. The second stage unit 50, in one embodiment, includes a coil 88, which surrounds the inlet 86, and a collection container 90, which is provided below the coil to collect contaminant material, e.g., flux. The coil 88 and collection container 90 are disposed within the chamber 84 of the second stage unit 50. The coil 88 is configured to receive cooled gas therein by means of a gas delivery tube 92, which is in fluid communication with the coil. In a certain embodiment, the gas delivery tube 92 may be a vortex tube and the cooled gas may be Nitrogen. Specifically, the vortex tube 92 operates by taking air and rotating the air about an axis. The tube creates cold and hot air by forcing compressed air at a high rate of speed, e.g., 1,000,000 rpm, into a vortex. The high speed air heats up as it spins along the inner walls of the tube towards one end of the tube. A percentage of the hot air exits the tube by a valve (not shown). The cooler air is then forced up through the center of the high speed air stream in a second vortex. This slower moving air becomes cold. The vortex tubes can generate temperatures down to approximately 100° F. below the temperature of the inlet air supply. In other embodiments, compressed air may also be employed.

The tube 92 is connected to the coil 88 by a gas inlet 98. The coil exhausts air through the gas outlet 100. One particular advantage with a vortex tube is that there are no parts to wear out or break due to damage. The arrangement is such that when introducing cooled gas in the coil 88 via tube 92, contaminants in the vapor stream condense on the coil. Once the coil 88 has collected a sufficient amount of coalesced contaminants, the introduction of cooled gas in the coil is terminated. When ceasing the delivery of cooled gas in the coil 88, contaminants coalesced on the coil are released and collected in the collection container 90. In one embodiment, an in-line heating element 94 may be provided to heat the gas that is introduced in the coil 88. The heated coil melts the coalesced contaminants, which fall into the container 90.

The operation of the second stage unit 50 shown in FIG. 4 is as follows. The inlet tube 92 introduces the cooled gas into the coil 88 to create a cold collection surface on the coil. Flux contaminants, for example, contained within the vapor stream condense on the cooled coil 88 and coalesce to remain on the coil. During operation, the delivery of cooled gas in the coil 88 does not affect the temperature within the tunnel 12 of the reflow apparatus 10 since the gas is contained within the coil. Once the cool gas in the coil 88 is heated by the vapor stream, the gas may be exhausted from the coil either outside the reflow apparatus 10 or reused elsewhere within the reflow apparatus. The walls of the housing 52 of the system 44 remain warm by virtue of heat generated by the reflow oven so that little or no contamination or residue is collected on the walls of the housing. Once the coil 88 has collected a sufficient amount of contaminant vapors, e.g., flux vapors, on its outer surface, the delivery of cold gas into the coil may be terminated. With no cool gas entering the coil 88, the temperature of the coil rises, and contaminants accumulated on the outer surface of the coil return to their liquid form. The in-line heating element 94 may alternatively be employed to heat the coil 88. Once liquefied, the contaminants drip off of the coil 88 and are collected in the collection container 90 that is positioned just under the coil. Once cleaned, the delivery of cool gas to the coil 88 may be started to begin the process again.

With the embodiment having the in-line heating element 94, the cooled gas that is provided by the tube 92 may be routed to the in-line heating element that assists in creating the self-clean function to clean the coil 88. By heating the gas, the process of heating the coil 88 is shortened thereby shortening the cleaning cycle. Once the coil 88 has collected a sufficient amount of contaminants, the cold gas is turned off (by a solenoid valve or some other suitable device) and the gas is routed to the in-line heating element 94 to heat the gas traveling through the coil. An air amplifier or blower 96 may be further employed to flow gas from the tunnel 12 of the reflow apparatus 10 to the system 44 and return the gas back to tunnel. Such an air amplifier 96 has no parts to become clogged or wear out. The vapor stream then travels from the coil 88 to the outlet 82 and back to the tunnel 12 via the output gas duct 46.

Consequently, the system 44 of embodiments of the invention is particularly designed to segregate vapor streams of differing temperatures that are withdrawn from different positions along the length of the tunnel 12 to separate systems. If, for example, a high-temperature vapor stream is withdrawn from a spike zone (28, 30 or 32) and mixed with a lower-temperature vapor stream from a pre-heat zone (14 or 16) or soak zone (18, 20 or 22) in a particular system 44, effluents that are condensed and filtered from the lower-temperature vapor stream may be re-vaporized by the high-temperature vapor stream, thereby reducing the efficiency of the system. The four systems 44 illustrated in FIG. 1 accordingly are configured to offer separate extraction and filtration from four different regions of the tunnel 12. Withdrawing vapor streams from different sections of the tunnel 12 also promotes greater capture of contaminants because each zone in the tunnel is independently temperature-controlled, and different components of the solder paste burn off in different zones.

Accordingly, the filtration capabilities of the filtration system of embodiments of the invention remove VOCs and other contaminants emitted from solder paste in a reflow solder apparatus without having to cease the operation of the reflow apparatus. Because VOCs and other contaminants are removed from the heat zones of the reflow tunnel, the circuit board assemblies may be delivered via the conveyor into the cooling zones with reduced concentrations of VOCs and other contaminants and, consequently, reduced potential for damage to the circuit board assembly and components within the tunnel due to contamination and residue build-up.

Thus, it should be observed that the flux extraction system of the embodiments of the invention is simpler in design and more efficient in operation. Specifically, both the first stage unit and the second stage unit employ flux collection containers that may be easily removed for cleaning without having to cease the operation of the oven. In particular, the second stage unit does not require a filter as with other systems.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A reflow apparatus for solder joining electronic components to a substrate, the apparatus comprising:
   a reflow chamber;
   a conveyor to convey a substrate within the chamber;
   at least one heating element to provide heat to reflow solder on the substrate; and
   at least one filtration system to remove contaminants generated by the reflow solder, the at least one filtration system being coupled with the chamber for passage of a vapor stream from the chamber through the filtration system, the at least one filtration system comprising a first stage unit including a cooling device and a filter device disposed adjacent the cooling device, the cooling device having a plurality of cooling fins to cool the vapor stream entering into the first stage unit, the arrangement being such that contaminants in the vapor stream condense on the cooling fins when passing the vapor stream over the cooling fins and are trapped by the filter device.

2. The reflow apparatus of claim 1, wherein the first stage unit further includes a heating element to heat contaminants condensed on the cooling fins and trapped by the filter device.

3. The reflow apparatus of claim 2, wherein the first stage unit further includes at least one collection container to collect heated contaminants from the cooling fins and the filter device.

4. The reflow apparatus of claim 1, wherein the first stage unit further includes a base having the cooling fins mounted thereon and a water-cooled chill plate secured to the base.

5. The reflow apparatus of claim 1, wherein the first stage unit further includes a base having the cooling fins mounted thereon, and a thermal removal element secured to the base.

6. The reflow apparatus of claim 5, wherein the thermal removal element includes a plurality of heat removal fins.

7. The reflow apparatus of claim 1, further comprising a second stage unit in fluid communication with the first stage unit to further remove contaminants within the vapor stream.

8. The reflow apparatus of claim 7, wherein the second stage unit includes a coil and a collection container.

9. The reflow apparatus of claim 8, wherein the coil is configured to receive one of cooled gas and heated gas therein, the arrangement being such that when introducing cooled gas in the coil, contaminants in the vapor stream condense on the coil, and when introducing heated gas in the coil, contaminants in the vapor stream are released from the coil and collected in the collection container.

10. The reflow apparatus of claim 9, wherein the coil is in fluid communication with a gas delivery tube.

11. The reflow apparatus of claim 10, wherein the gas delivery tube is a vortex tube.

12. A method for removing vaporized contaminants from inside a reflow apparatus, the method comprising:
   extracting a vapor stream including vaporized contaminants from a reflow apparatus;
   directing the vapor stream to a system configured to remove contaminants from the vapor stream;
   passing the vapor stream over cooling fins of the system;
   condensing vaporized contaminants on the cooling fins;
   periodically heating the cooling fins to remove contaminants from the cooling fins; and
   collecting the removed contaminants from the cooling fins.

13. The method of claim 12, further comprising passing the vapor stream through a filter device.

14. The method of claim 13, further comprising passing the vapor stream over at least one cooling coil and condensing vaporized contaminants on the cooling coil.

15. The method of claim 14, further comprising periodically raising the temperature of the cooling coil to remove contaminants from the coil.

16. The method of claim 15, further comprising collecting the removed contaminants from the cooling coil.

17. A method for removing vaporized contaminants from inside a reflow apparatus, the method comprising:
   extracting a vapor stream including vaporized contaminants from a reflow apparatus;
   directing the vapor stream to a system configured to remove contaminants from the vapor stream;
   passing the vapor stream over at least one cooling coil of the system;
   condensing vaporized contaminants on the cooling coil;
   periodically heating the cooling coil to remove contaminants from the cooling coil; and
   collecting the removed contaminants from the cooling coil.

* * * * *